United States Patent
Mansour

(10) Patent No.: US 6,901,256 B2
(45) Date of Patent: May 31, 2005

(54) CELLULAR/PCS CDMA SYSTEM WITH PILOT BEACONS FOR CALL HANDOFFS

(75) Inventor: Nagi A. Mansour, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 555 days.

(21) Appl. No.: 09/751,855

(22) Filed: Dec. 29, 2000

(65) Prior Publication Data

US 2002/0086675 A1 Jul. 4, 2002

(51) Int. Cl.[7] .................................................. H04Q 7/20
(52) U.S. Cl. ........................ 455/436; 455/442; 370/331
(58) Field of Search ................................ 455/436, 443, 455/446, 442; 370/342, 331, 335, 320; 375/130

(56) References Cited

U.S. PATENT DOCUMENTS

| | | | |
|---|---|---|---|
| 4,191,860 A | 3/1980 | Weber | |
| 5,247,571 A | 9/1993 | Kay et al. | |
| 5,303,285 A | 4/1994 | Kerihuel et al. | |
| 5,353,331 A | 10/1994 | Emery et al. | |
| 5,694,463 A | 12/1997 | Christie et al. | |
| 6,078,571 A | * 6/2000 | Hall | 370/331 |
| 6,188,906 B1 | * 2/2001 | Lim et al. | 455/453 |
| 6,388,998 B1 | * 5/2002 | Kasturia | 370/320 |
| 6,556,551 B1 | * 4/2003 | Schwartz | 370/331 |
| 6,621,811 B1 | * 9/2003 | Chang et al. | 370/342 |
| 2001/0033600 A1 | * 10/2001 | Yang et al. | 375/130 |

* cited by examiner

Primary Examiner—David Hudspeth
Assistant Examiner—S. Smith

(57) ABSTRACT

A CDMA PCS telecommunications cell (40) of increased capacity includes a plurality of sectors (42, 44, 46) controlled by a base station (14) using a defined set of CDMA codes for each sector. Capacity is increased by configuring the base station to operate at two different, non-interfering frequencies within each sector of the cell. One frequency may be used either for normal traffic or for handing off calls to or from adjacent cells. One frequency is preferably used to operate a pilot beacon for transferring calls between adjacent cells in a soft manner.

11 Claims, 2 Drawing Sheets

CELLULAR/PCS CDMA SYSTEM WITH PILOT BEACONS FOR CALL HANDOFFS

BACKGROUND OF THE INVENTION

1. Field of the Invention

The present invention relates to the field of digital cellular wireless telecommunications. More particularly, the invention relates to the use of pilot beacons to facilitate call handoffs in digital CDMA, wireless telecommunications networks.

2. Description of the Prior Art

Conventional cellular phone systems divide a city or other service area into a number of cells that are each equipped with a transceiver. As a cellular telephone moves from one cell to another, it is "handed off" from cell to cell by a mobile switching center, which determines from which cell the signal strength is strongest.

There are two basic forms of call handoffs: hard handoffs and soft handoffs. Hard handoffs are performed on a "break before make" basis, requiring a call connection to be broken in the original cell before it is made in the next cell. Hard handoffs are required in systems that use frequency division multiple access (FDMA) and time division multiple access (TDMA) because these systems employ different frequencies in adjacent cells and therefore require a call to be transferred from one frequency to another when transferring between cells.

In contrast, soft handoffs employ a "make before break" routine where a call is connected to a new cell before it is broken from the previous cell. Soft handoffs can be provided by wireless communication services using code division multiple access (CDMA) techniques. CDMA is a digital spread-spectrum modulation technique that digitizes wireless conversations and tags them with special codes. The digitized data is spread across the frequency band in a pseudo random pattern. Receiving mobile phones are instructed to decipher only the data corresponding to particular codes to reconstruct the signal. CDMA networks provide soft handoffs because they do not require the use of different frequencies in adjacent cells. However, as described below, even CDMA networks require hard handoffs in certain circumstances where an increase in capacity is warranted above what is provided by one RF frequency.

A typical CDMA PCS telecommunications system is comprised of one tier of cells that operates at one frequency F1. Each cell includes a base station unit and three sector antennas that together provide wireless communications in three sectors of the cell each covering 120°. One method to increase the capacity of this system is to add a second tier of cells on the top of the first tier at another frequency F2. Usually the first tier at F1 has wider area coverage in comparison to the second tier at F2. A problem arises when a mobile is moving from the F2 coverage area to an area with only F1 coverage. This would require a hard handoff. Sometimes the hard handoff from F2 down to F1 does not occur smoothly and might result in a dropped call.

One prior art solution to the above problem has been to add at the cell adjacent to the edge coverage of F2 a base station that supports a pilot beacon at F2. The pilot beacon base station has only three channels: a pilot channel, a paging channel, and a synchronization channel. This is not an economical solution as it results in the addition of a nearly complete second base station to act as the pilot beacon to assist in the hard handoff process. However, the current IS-95 A/B uses a predefined set of sixty-four CDMA Walsh codes for each sector, with one of the codes used for pilot channel, another for synchronization, one commonly used for paging, and the remainder available for ordinary traffic. In total one would expect to use more than 32 codes. The rest will be used for the pilot beacon.

Thus, using two or more frequencies in CDMA telecommunications cells requires hard call handoffs when a call on a first frequency must be handed off to an adjacent cell at a second frequency. Adding more base stations to add more traffic channels therefore eliminates some of the call handoff advantages of CDMA systems. The use of multiple base stations or pilot beacons in a cell is also an expensive solution because it requires additional equipment.

SUMMARY OF THE INVENTION

The present invention solves the prior art problems discussed above and provides a distinct advance in CDMA networks. In particular, the system of the present invention provides a CDMA base station that has the capability to operate as a normal base station at a first frequency F1 and as a pilot beacon at a second frequency F2. The pilot beacon provides pilot, paging, and synchronization channels to assist in the handoff of calls between cells even if the calls must be transferred between different frequencies. Importantly, the pilot beacon portion of the base station achieves the foregoing without the use of additional traffic channels. The pilot beacon therefore assists in providing soft call handoffs without the extra expense of separate base stations or pilot beacons in every cell.

The CDMA cell of the present invention includes a single base station unit and a plurality of antennas that configure the cell into a plurality of sectors. The base station controls transmission and reception over the antennas using selected ones of a defined set of CDMA codes for each of the sectors. Each sector preferably includes two antennas coupled with the base station. The base station is configured to divide the number of available Walsh codes or channels for each sector so that each antenna in each sector operates at a separate frequency and handles a portion of the Walsh codes or channels for the sector. This provides two transmission frequencies in each sector with a single base station, thereby increasing effective cell capacity by a factor of two without increasing the number of base stations.

In one example, the base station has 64 Walsh codes that are allocated between a full base station and a pilot beacon. One sector of the cell is divided into two segments, the first of which having 60 Walsh codes is used as a full base station that supports traffic. The second segment of Walsh codes are assigned to the pilot beacon with, for example, code 64 for pilot, code 63 for paging and code 62 for synchronization.

Certain cells in a wireless network service area may not need two frequencies for traffic channels because a single frequency is adequate to handle all traffic therein. In accordance with another aspect of the present invention, the base station may be configured to operate as both a full base station for the first frequency and as a pilot beacon for a second frequency. The pilot beacon provides pilot, paging, and synchronization channels but no traffic channels. The pilot, paging, and synchronization channels assist in the transfer of calls from adjacent cells operating at the second frequency to the first frequency provided by the full base station so that the calls are handed off in a smoother manner to the first frequency. The pilot beacon therefore in essence extends the coverage of the adjacent cells until calls operating at a second frequency can be handed off to the first frequency of the cell in which the pilot beacon is located. Similarly, the pilot beacon uses the pilot, paging, and synchronization channels to hand off calls to adjoining cells in a smoother manner. The configuration of the base station to operate as a pilot beacon for the second frequency rather than as a full base station requires no additional traffic channels.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENT

Figure 1:
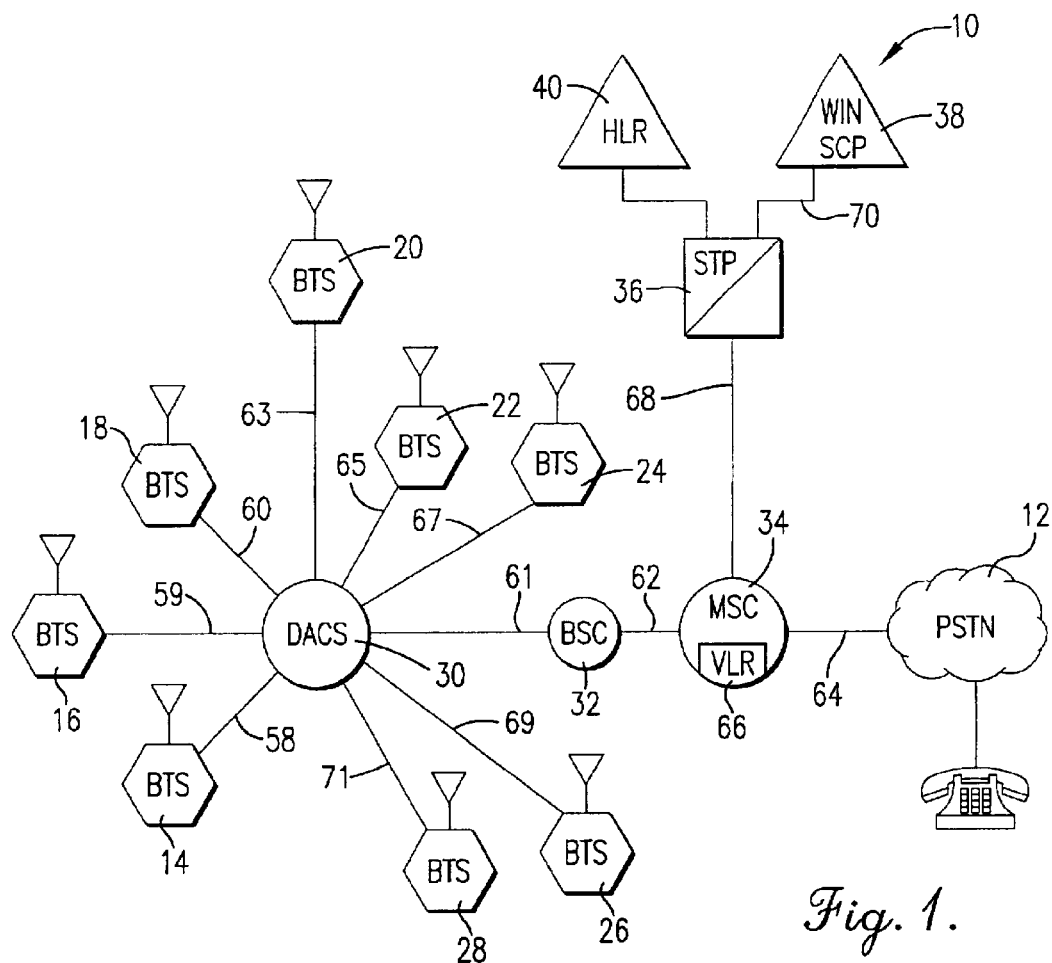
FIG. 1 is a schematic diagram broadly illustrating a CDMA wireless network configured in accordance with a preferred embodiment of the present invention.

Turning now to the drawing figures, an example of a wireless telecommunications network 10 that may be used to implement a preferred embodiment of the present invention is illustrated. The illustrated architecture is shown for purposes of disclosing a preferred embodiment and can be modified as a matter of design choice. The wireless network is preferably a code division multiple access (CDMA) PCS wireless network such as the PCS network owned and operated by Sprint PCS. The wireless network is coupled with a public switched telephone network (PSTN) 12; which is used herein to refer to the entire local, long distance, and international landline phone system used in the United States, which includes well known components such as central office local exchange carriers (LECs) and interexchange carriers (IXCs).

The wireless network 10 broadly includes a plurality of base stations (BTSs) 14, 16, 18, 20, 22, 24, 26, 28 a digital access and cross-connect system (DACS) 30, a base station controller (BSC) 32, a mobile switching center (MSC) 34, a signal transfer point (STP) 36, a wireless intelligent network service control point (WIN SCP) 38, and a home location register (HLR) 40, all interconnected by signaling data links and trunk circuits as described below.

Figure 2:
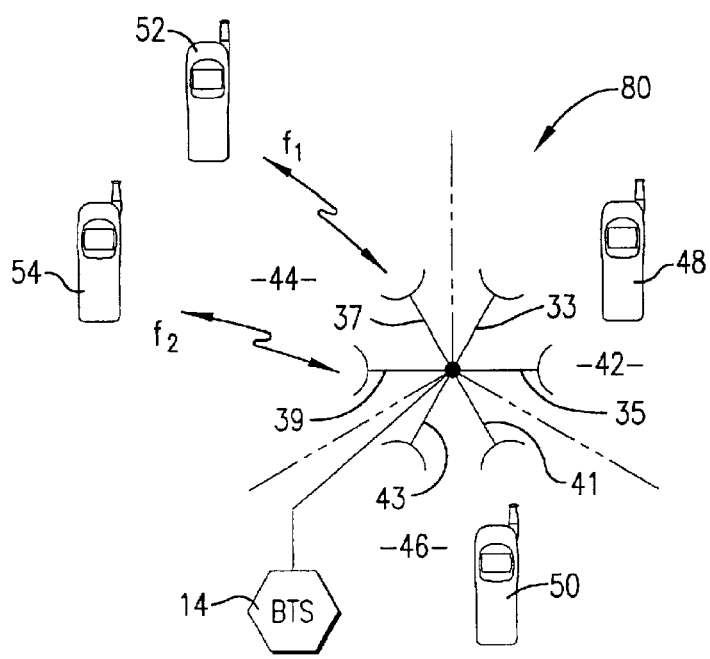
FIG. 2 is a schematic diagram of a base station of the wireless network.

The BTSs 14–28 each provide wireless communications in telecommunications cell 80 to mobile phones 48, 50, 52, 54 and other wireless devices present in the cell. FIG. 2 illustrates BTSs 14, 16 in more detail. BTSs 14, 16 include a plurality of transceivers that are coupled with a plurality of antennas 33, 35, 37, 39, 41, 43. The BTS and antennas provide wireless communications in a cell 40 and are configured to subdivide the cell into three sectors 42, 44, 46, each spanning 120°. Two of the antennas are positioned in each sector of the cell. Specifically, the sector 42 includes antennas 33 and 35; the sector 44 includes antennas 37 and 39; and the sector 46 includes antennas 41 and 43. BTS 14 operates at a frequency F1 and BTS 16 operates at a frequency F2. Mobile phones 48 and 50 operate in cell 80 at frequency F1 using BTS 14 and mobile phones 52 and 54 operate in the same cell at frequency F2 using BTS 16.

Figure 3:
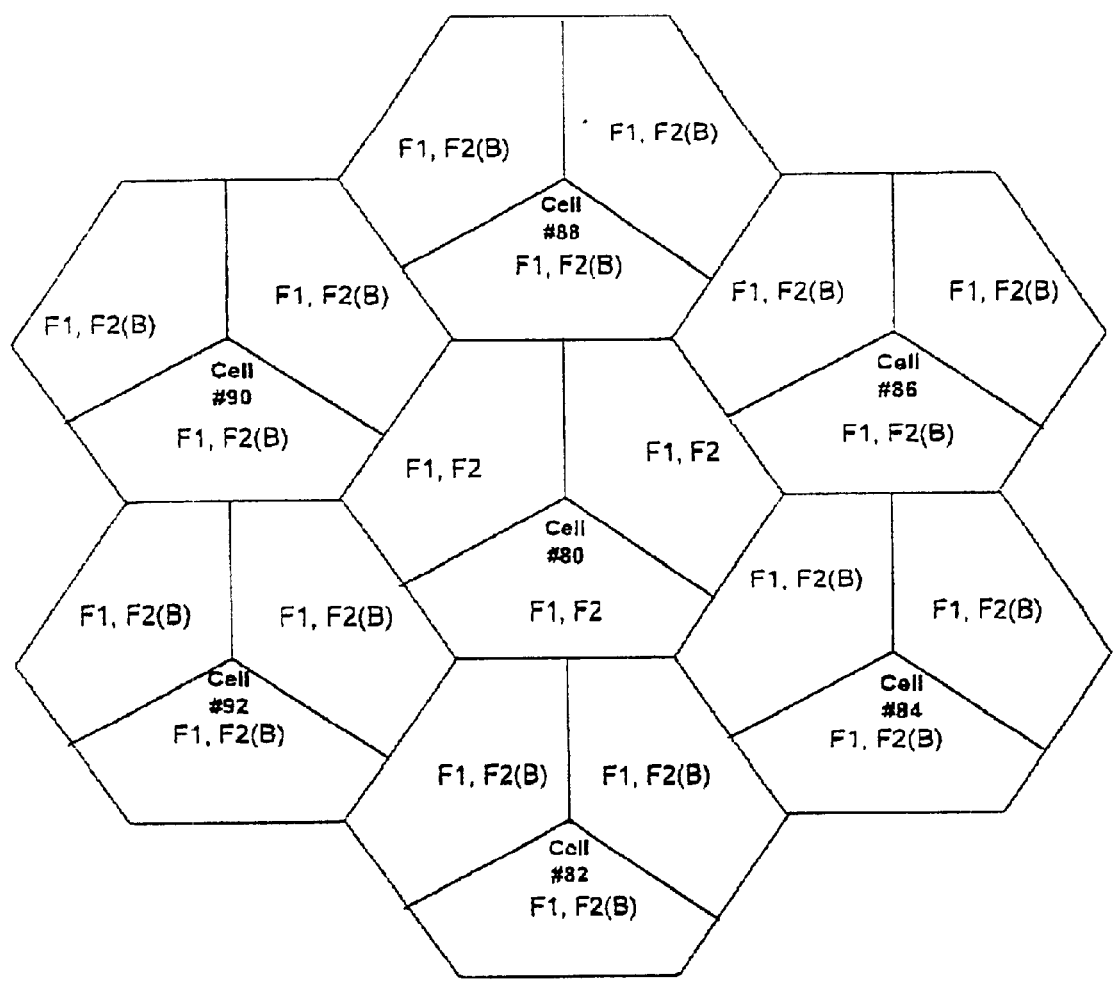
FIG. 3 is a schematic diagram of a tier of cells.

FIG. 3 is a schematic diagram of a tier of seven cells 80, 82, 84, 86, 88, 90, 92. The center cell has two base stations that operate at frequencies F1 and F2, respectively. The other six cells each have only one base station that operates as a full base station at F1 and as a pilot beacon at F2. This will assist a mobile moving from cell 80 at F2 to any of the surrounding cells 82–92 that operates at F1. BTS 18 provides communications in cell 82, BTS 20 provides communications in cell 84, and so on.

For those cells that require two frequencies for traffic, the base stations 14, 16 are used to double the capacity in this coverage area. However, not all cells in a typical CDMA network need two frequencies for traffic channels because of lower call density in the cells. Cells 82–92 satisfy this condition and low traffic is required at frequency F1 only.

The BTS 18 is operable to control transmission and reception of CDMA PCS traffic in the cell 82 using selected ones of a defined set of codes for each sector 42, 44, 46. The codes may include, for example, 64 Walsh codes for each sector. In accordance with one aspect of the present invention, the BTS is configured to divide the 64 available Walsh codes for each sector of its cell between two RF frequencies (F1, F2) in the sector. The base station 18 of cell 82 may be configured to operate as both a full base station for the first frequency and as a pilot beacon for a second frequency. The full base station portion operates as described above. However, the pilot beacon portion operates primarily to ensure soft call handoffs. For example, the BTS may operate at a first frequency F1 (e.g., 1931.25 MHZ) then to act as a pilot beacon, it will be programmed to operate at a second frequency F2 (e.g., 1933.75 MHZ). The mobile stations 48, 50, 52, 54 are programmed to scan between frequencies F1 and F2 and to lock onto the strongest pilot channel. The configuration of a base station to operate two frequencies eliminates the need for a second base station to act as a pilot beacon. One BTS will provide the hardware required to operate two frequencies F1 and F2.

In more detail, the pilot beacon provides pilot, paging, and synchronization channels but no traffic channels. The pilot beacon uses the pilot, paging, and synchronization channels to hand off calls from adjacent cells to the cell in which the pilot beacon is located. Specifically, the BSC 32 monitors calls that are being served by adjacent cells at the second frequency and then assists in the transfer of these calls to the first frequency as the calls enter the cell in which the pilot beacon is located. The pilot beacon therefore in essence extends the coverage of the adjacent cells until calls operating at the second frequency can be handed off to the first frequency of the cell in which the pilot beacon is located. This permits calls to be transferred from the second frequency to the first frequency in a smoother manner without requiring the pilot beacon to provide traffic channels at the second frequency. The full base station portion of the base station 18 in which the pilot beacon is located then serves the call over the first frequency.

Similarly, the pilot beacon may use the second frequency to assist in the handoff a call that was originated in its cell on the first frequency to an adjacent cell that needs to receive the call over the second frequency. The configuration of the base station to operate as a pilot beacon for the second frequency rather than as a full base station eliminates the need to provide a second base station that acts as a pilot beacon.

Returning to FIG. 1, the DACS 20 is coupled with the BTSs 14, 16, 18, 20, 22, 24, 26, 28 with signaling data links and trunk circuits 58, 59, 60, 63, 65, 67, 69, 71 and is operable for routing and switching control messages between the BTSs and the other components in the wireless network. The BSC 32 is coupled with the DACS with signaling data links and trunk circuits 61 and is operable to control operation of the DACS and the BTSs 14, 16, 18, 20, 22, 24, 26, 28. The BSC is basically a high-capacity switch that provides total overview and control of wireless functions supported by the network such as call handoff control, cell configuration management, and BTS and mobile phone power level management. The BSC multiplexes signals from the BTSs into transmission signals that are sent to the MSC 34. The BSC also routes network signals and calls from other components of the wireless network to the appropriate BTS for transmission to the mobile stations.

The MSC 34 is coupled with the BSC 32 and other base station controllers with signaling data links and trunk circuits 62 and is operable to coordinate the establishment of calls to and from the mobile stations 48-54 and to handle transmission facilities management, mobility management, and call processing. The MSC is also connected with the PSTN 12 by signaling data links and trunk circuits 64 to provide switching between the wireless network and the PSTN.

The MSC 34 either includes an integrated visitor location register (VLR) 66 or is coupled with a stand-alone VLR. The VLR includes a database that contains information relating to visiting mobile phones that are roaming outside of their home service area. When a mobile phone is roaming in a visiting service area, the local provider in the visiting service area queries the HLR 40 through the STP 36 using Signaling System#7 (SS7) or other signaling to retrieve information needed to verify the legitimacy of the mobile phone and to obtain a profile of the features associated with the mobile phone. The HLR responds to the query by transferring the necessary data to the VLR. This information is maintained in the VLR of the local provider as long as the roaming mobile phone remains active within that coverage area. The HLR also updates its own database to indicate the current location of the roaming mobile phone so that it can divert calls to the phone through the local provider in the visiting service area. The querying process in the preferred wireless network is accomplished via SS7 links using the STP and SCP as described below.

The STP 36 is connected between the MSC 34 and the WIN SCP 38 by signaling data links 68 and 70 and is operable to route signaling messages therebetween. STPs are well known in the art with an example being the DSC Megahub.

The WIN SCP 38, which is well known in the art, preferably uses TCAP protocols to perform transaction processing for wireless calls. However, other signaling systems or means to exchange messages are equally applicable to the present invention. The WIN SCP is coupled with the STP 36 to exchange signaling messages with the MSC 34 and other mobile switching centers. The WIN SCP may also include a plurality of databases for providing intelligence and certain enhanced services to the wireless network.

The HLR 40 may be a database residing on the WIN SCP 38 or may be a stand-alone database servicing several SCPs. In either case, the HLR includes a database containing subscriber data and information used to identify a subscriber of the wireless network and subscriber data relating to features and services available to the subscriber. The HLR, which represents the "home" database for subscribers, may, for example, contain a record for each home subscriber that includes location information, subscriber status, subscribed features, and directory numbers. The HLR is used in conjunction with the VLR 66 as described above to support mobility management features to which the user has subscribed when that user is roaming outside of his home area.

As is well known in the art, the MSC 34, STP 36, WIN SCP 38, HLR 40, and VLR 66 all communicate via out of band signaling, typically using SS7 or TCP/IP protocols to facilitate the routing of calls through the wireless network. The signaling allows the network elements to exchange information to more quickly and efficiently route calls over the network.

Although the invention has been described with reference to the preferred embodiment illustrated in the attached drawing figures, it is noted that equivalents may be employed and substitutions made herein without departing from the scope of the invention as recited in the claims. For example, although the preferred wireless telecommunications network is a CDMA network, the principles of the present invention may be implemented with other types of wireless telecommunications networks.

Having thus described the preferred embodiment of the invention, what is claimed as new and desired to be protected by Letters Patent includes the following:

1. A telecommunications network comprising:
   a first telecommunications cell having
      a first plurality of antennas oriented for subdividing the first cell into a plurality of sectors, each sector having first and second antennas positioned therein,
      a first base station coupled with the first antenna in each of the sectors for controlling wireless communication in the cell at a first frequency for handling traffic on the first frequency, and
      a second base station coupled with the second antenna in each of the sectors for controlling wireless communication in the cell at a second frequency for handling traffic on the second frequency; and
   a second telecommunications cell adjacent the first cell and having
      a second plurality of antennas oriented for subdividing the second cell into a plurality of sectors, each sector having first and second antennas positioned therein, and
      a third base station coupled with the first antenna in each of the sectors for controlling wireless communication at the first frequency for handling traffic on the first frequency, and coupled with the second antenna in each of the sectors for operating at the second frequency as a pilot beacon for handing off calls to and from the first cell in a soft manner.

2. The network as set forth in claim 1, the first frequency being about 1931.25 MHZ.

3. The network as set forth in claim 1, the second frequency being about 1933.75 MHZ.

4. The network as set forth in claim 1, third base station being configurable to operate the second frequency for handling traffic or for handing off calls to the first frequency.

5. The network as set forth in claim 1, the third base station being configurable to operate the second frequency for handling traffic or for handing off calls to the first frequency.

6. The network as set forth in claim 1, the third base station being configured for operating the second antenna at the second frequency as a pilot beacon for handing off calls to and from the first cell in a soft manner.

7. The network as set forth in claim 6, wherein the pilot beacon provides no traffic channels.

8. The network as set forth in claim 1, wherein the pilot beacon provides pilot, paging, and synchronization channels.

9. The network as set forth in claim 1, wherein the telecommunications network is a CDMA telecommunications network.

10. A telecommunications network comprising:
  a first telecommunications cell having
    a first plurality of antennas oriented for subdividing the cell into a plurality of sectors, each sector having first and second antennas positioned therein,
    a first base station coupled with the first antenna in each of the sectors for controlling wireless communication in the cell at a first frequency for handling traffic on the first frequency,
    a second base station coupled with the second antenna in each of the sectors for controlling wireless communication in the cell at a second frequency for handling traffic on the second frequency; and
  a second telecommunications cell adjacent the first cell and having
    a second plurality of antennas oriented for subdividing the cell into a plurality of sectors, each sector having first and second antennas positioned therein, and
    a third base station coupled with the antennas for controlling wireless communication in the cell using selected ones of a defined set of codes for each of the sectors, the base station being configured for dividing the codes between the two antennas in each sector, operating the first antenna at the first frequency for handling traffic on the first frequency, and operating the second antenna at the second frequency as a pilot beacon for handing off calls to and from the first cell in a soft manner.

11. A CDMA telecommunications network comprising:
  a first telecommunications cell having
    a plurality of antennas oriented for subdividing the cell into a plurality of sectors, each sector having first and second the antennas positioned therein,
    a first base station coupled with the first antenna in each of the sectors for controlling wireless communication in the cell at about 1931.25 MHZ for handling traffic on about 1931.25 MHZ,
    a second base station coupled with the other one of the antennas in each of the sectors for controlling wireless communication in the cell at about 1933.75 MHZ for handling traffic on about 1933.75 MHZ; and
  a second telecommunications cell adjacent the first cell and having
    a second plurality of antennas oriented for subdividing the cell into a plurality of sectors, each sector having two of the antennas positioned therein, and
    a third base station coupled with the antennas for controlling wireless communication in the cell using selected ones of a defined set of codes for each of the sectors, the base station being configured for dividing the codes between the two antennas in each sector, operating one of the two antennas at about 1931.25 MHZ for handling traffic on about 1931.25 MHZ, and operating the other of the two antennas at about 1933.75 MHZ as a pilot beacon for handing off calls to and from the first cell in a soft manner, wherein the pilot beacon provides pilot, paging, and synchronization channels, but no traffic channels.

* * * * *